(12) United States Patent
Nishimura et al.

(10) Patent No.: US 11,159,449 B1
(45) Date of Patent: Oct. 26, 2021

(54) DISPATCHING TASKS AND DATA USING MULTI-ACCESS EDGE COMPUTING

(71) Applicant: International Business Machines Corporation, Armonk, NY (US)

(72) Inventors: Yasutaka Nishimura, Yamato (JP); Shoichiro Watanabe, Tokyo (JP); Sanehiro Furuichi, Setagaya-ku (JP); Kenichi Takasaki, Shibuya (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/924,415

(22) Filed: Jul. 9, 2020

(51) Int. Cl.
| | | |
|---|---|---|
| *G06F 15/16* | (2006.01) |
| *H04L 12/927* | (2013.01) |
| *H04L 12/911* | (2013.01) |
| *H04L 29/08* | (2006.01) |
| *H04L 12/717* | (2013.01) |
| *H04L 12/707* | (2013.01) |

(52) U.S. Cl.
CPC ............ *H04L 47/805* (2013.01); *H04L 45/22* (2013.01); *H04L 45/42* (2013.01); *H04L 47/781* (2013.01); *H04L 67/322* (2013.01); *H04L 67/325* (2013.01)

(58) Field of Classification Search
CPC ..... H04L 47/805; H04L 47/781; H04L 45/22; H04L 45/42; H04L 67/322; H04L 67/325
USPC ........................................................ 709/223
See application file for complete search history.

(56) References Cited

U.S. PATENT DOCUMENTS

| | | | | |
|---|---|---|---|---|
| 7,945,470 B1* | 5/2011 | Cohen | ..................... | G06Q 10/06 705/7.13 |
| 9,245,241 B2* | 1/2016 | Kite | ........................ | G06Q 10/06 |
| 2013/0304863 A1* | 11/2013 | Reber | ..................... | G05B 15/02 709/218 |
| 2016/0226966 A1* | 8/2016 | Lin | ........................ | G06F 9/5027 |

(Continued)

FOREIGN PATENT DOCUMENTS

| | | |
|---|---|---|
| CN | 108845885 A | 11/2018 |
| WO | 2017211377 A1 | 12/2017 |
| WO | 2019199362 A1 | 10/2019 |

OTHER PUBLICATIONS

Lamb et al., "Analysis of Mobile Edge Computing for Vehicular Networks", Published online Mar. 15, 2019, Copyright © 2019 by the authors, 24 pages, <https://www.ncbi.nlm.nih.gov/pmc/articles/PMC6470697/>.

(Continued)

*Primary Examiner* — Ruolei Zong
(74) *Attorney, Agent, or Firm* — Jordan A. Lewis; Brian M. Restauro

(57) ABSTRACT

Embodiments of the present invention provide a computer system, a computer program product, and a method that comprises in response to receiving a data packet from a computing device, classifying the data packet as a task having one or more portions; allocating the classified task to a processing location within a data region based on a location of the computing device; in response to a change associated with the task, dynamically calculating alternate processing locations within a radius of the data region to process one or more portions of the task based on scoring values associated with the change; and redistributing at least one portion of the classified task according to an alternate processing location of dynamically calculated alternate processing locations.

25 Claims, 12 Drawing Sheets

(56) References Cited

U.S. PATENT DOCUMENTS

2019/0116128 A1* 4/2019 Guo ................... H04L 67/1008
2020/0351336 A1* 11/2020 Campbell ............... H04W 8/22
2020/0351724 A1* 11/2020 Guo ................... H04L 67/1027

OTHER PUBLICATIONS

Ojanpera et al., "Application Synchronization among Multiple MEC Servers in Connected Vehicle Scenarios", 978-1-5386-6358-5/18, © 2018 IEEE, 5 pages.
Sajnani et al., "Latency Aware and Service Delay with Task Scheduling in Mobile Edge Computing" Communications and Network, 2018, 10, 127-141, Oct. 9, 2018, <DOI: 10.4236/cn.2018.104011>.
Dassa et al., "Method and System for Delegating Task Computations Between Local Devices, Multi-Access Edge Computing, and a Cloud Computing Environment", An IP.com Prior Art Database Technical Disclosure, IP.com No. IPCOM000259052D, IP.com Electronic Publication Date: Jul. 8, 2019, Copyright. Yahoo! 2019.
Mell et al., "The NIST Definition of Cloud Computing", Recommendations of the National Institute of Standards and Technology, NIST Special Publication 800-145, Sep. 2011, 7 pages.

\* cited by examiner

DISPATCHING TASKS AND DATA USING MULTI-ACCESS EDGE COMPUTING

BACKGROUND

The present invention relates generally to the field of navigational systems and map services, and more specifically coordinating maps and digital agents that are distributed over servers and networks.

Multi-access edge computing ("MEC"), formerly mobile edge computing, is a network architecture concept that enables multiple network cloud computing capabilities and information technology service environment at the edge of any network. Network architecture is the design of a computer network. It is a framework for the specification of a network's physical components and their functional organization and configuration, its operational principals and procedures, as well as communication protocols used. In telecommunication, the specification of a network architecture may also include a detailed description of products and services delivered via a communications network.

Advanced driver-assistance systems ("ADAS") are electronic systems that help the vehicle driver while driving or during parking. When designed with a safe human-machine interface, they are intended car safety and more generally road safety. ADAS systems use electronic technology such as microcontroller units ("MCU"), electronic control units ("ECU"), and power semiconductor devices. Advanced driver-assistance systems are systems developed to automate, adapt and enhance vehicle systems for safety and better driving. The automated system that is provided by ADAS to the vehicle is proven to reduce road fatalities, by minimizing the human error.

There are systems that includes a mobile edge computing server operating in a corresponding service area of the network that is configured to define at a computing area within the corresponding service areas, and systems that include a plurality of hosts for performance metrics of respective services offered to be used by the application executing at the host and constructing a zone map. Each of these solutions would be far more efficient and increase the safety of these map functions if the service area of the network dynamically communicates with the system and classifies the data based on multiple factors. For example, a disadvantage of these solutions is receiving map information from all areas or only receiving map information from a single area, which could cause issues with the amount of information the system is able to process. However, neither one of these references or any other references provide dynamically dispatching tasks and data based on a latency and data size in relation to the current position of a user.

SUMMARY

Embodiments of the present invention provide a computer system, a computer program product, and a method that comprises in response to receiving a data packet from a computing device, classifying the data packet as a task having one or more portions; allocating the classified task to a processing location within a data region based on a location of the computing device; in response to a change associated with the task, dynamically calculating alternate processing locations within a radius of the data region to process one or more portions of the task based on scoring values associated with the change; and redistributing at least one portion of the classified task according to an alternate processing location of dynamically calculated alternate processing locations.

DETAILED DESCRIPTION

Figure 1:
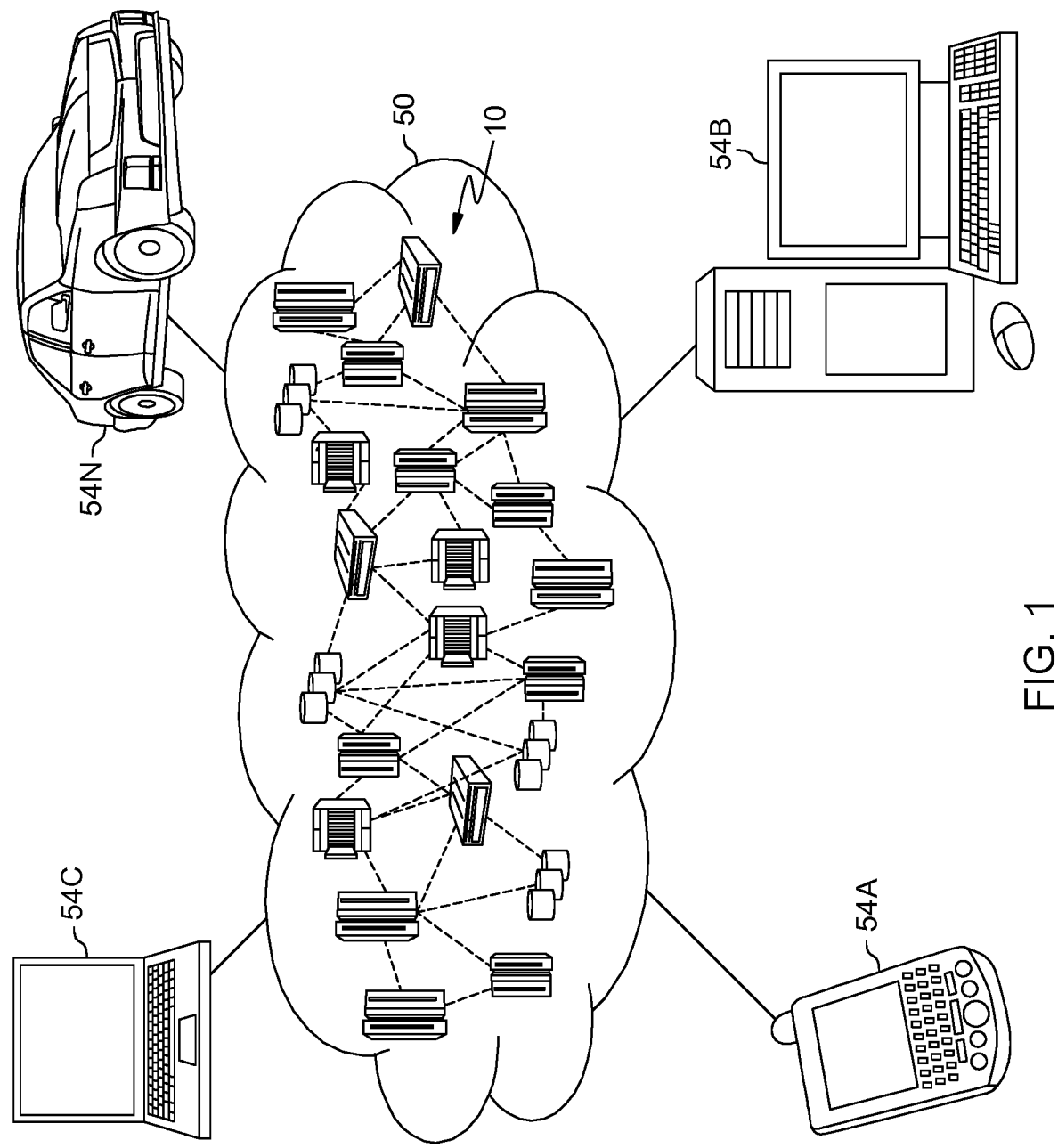
FIG. 1 depicts cloud computing environment, in accordance with an embodiment of the present invention.

Embodiments of the present invention recognize the need for a system supporting Multi-Access Edge Computing ("MEC") the deploys computer resources to networks to provide data processing techniques that require high security. Embodiments of the present invention provides systems, methods, and computer program products for a need to delegate tasks to a suitable environment by providing data based on region and latency that is supported by MEC. Embodiments of the present invention, Currently, methods to delegate task depending on the region and latency are generally not performed based on priority or time of delay. Generally, it is inefficient to configure an MEC server to have all data regions, making it necessary for a MEC server to share data with another MEC server. Embodiments of the present invention are an improvement on current task delegation and map systems by using a MEC system that classifies tasks depending on latency, data lifetime, and data size; collecting context information in the form of data that depends on the region; determining the usage of the collected context information based on the basis of data class; and determining how to process the collected information. Embodiments of the present invention receive information, describe information as a task or general data, allocates classified information to map regions, and determines how to process the classified data using a regional manager and local manager.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
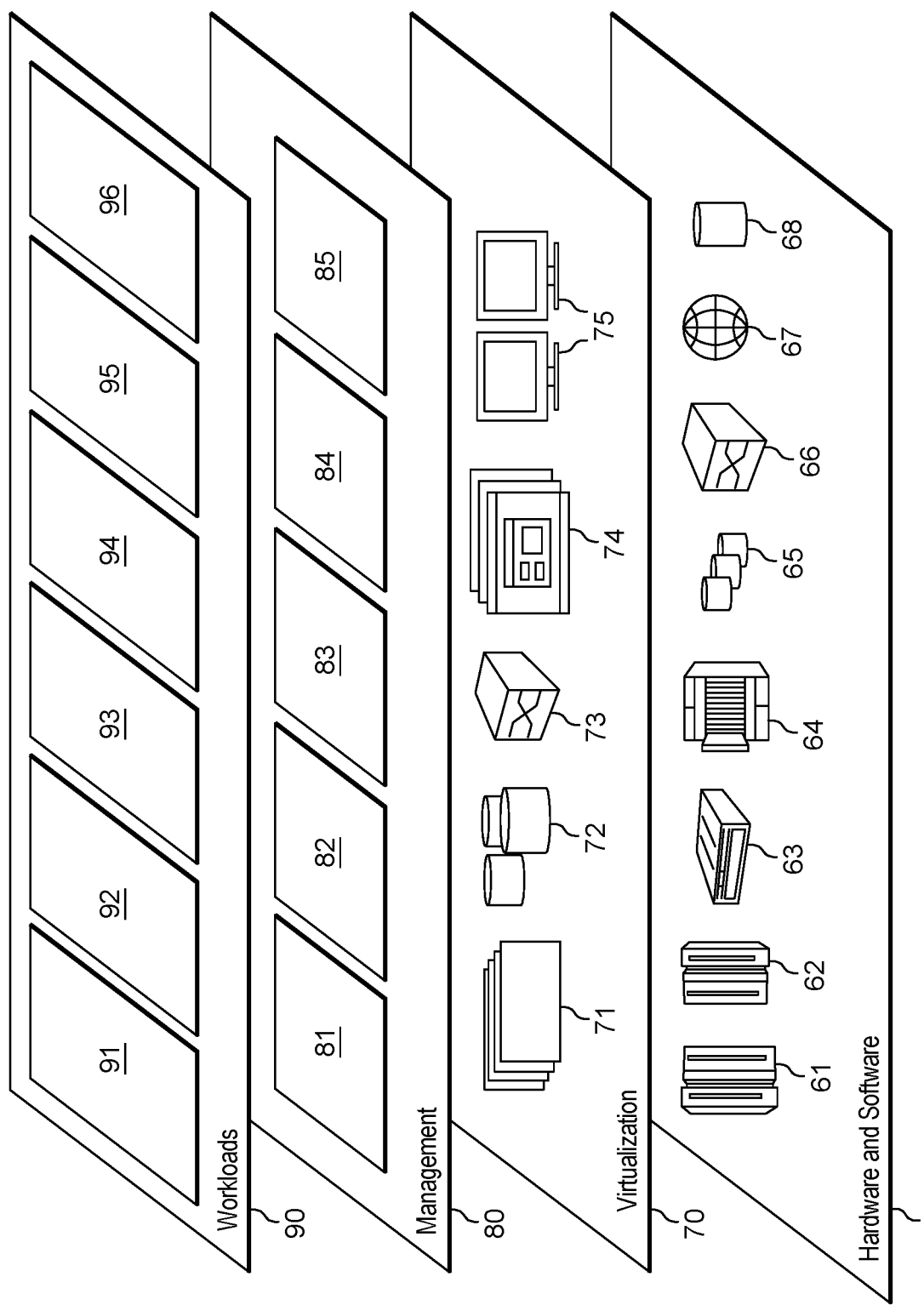
FIG. 2 depicts an abstraction model of layers, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise application 96. Some example embodiments of the present invention will be described in the following paragraphs.

Figure 3:
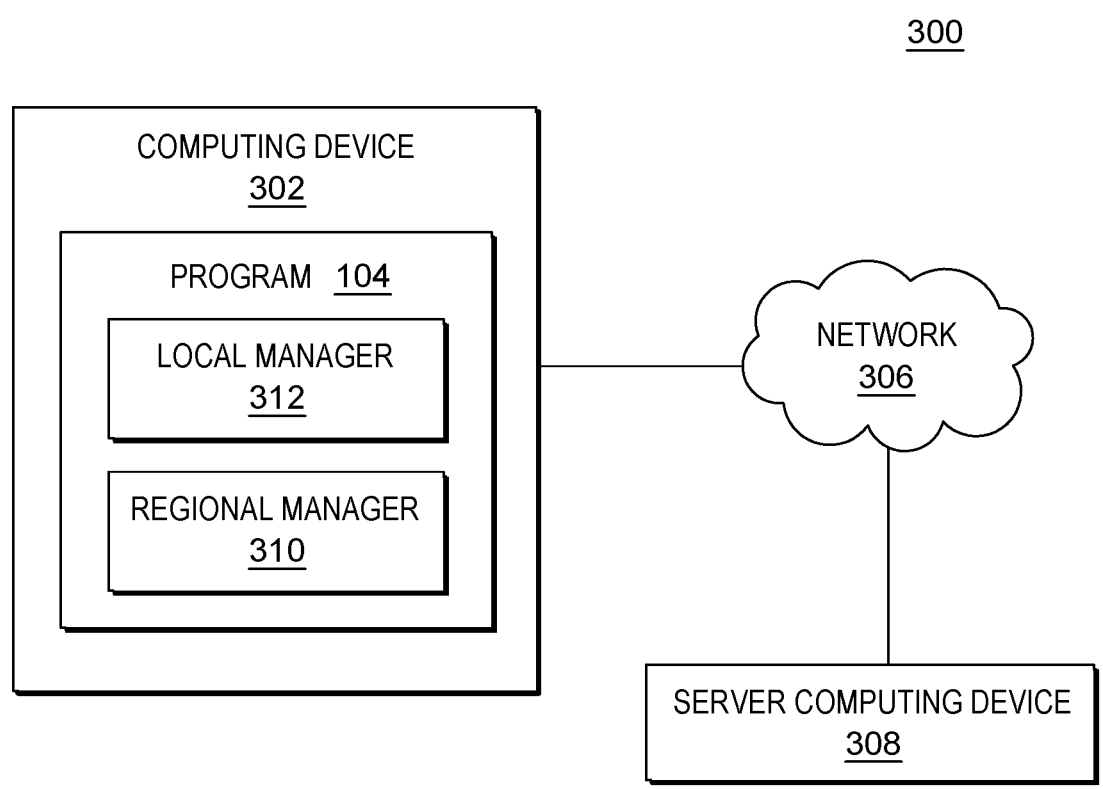
FIG. 3 is a functional block diagram illustrating a computing environment, in accordance with an embodiment of the present invention.

FIG. 3 is a functional block diagram of a computing environment 300 in accordance with an embodiment of the present invention. The computing environment 300 includes a computing device 302 and server computing device 308. The computing device 302 and the server computing device 308 may be desktop computers, laptop computers, specialized computer servers, smart phones, smart appliances, smart devices, or any other computing devices known in the art. In certain embodiments, the computing device 302 and the server computing device 308 may represent computing devices utilizing multiple computers or components to act as a single pool of seamless resources when accessed through a network 306. Generally, the computing device 302 and the server computing device 308 may be representative of any electronic devices, or a combination of electronic devices, capable of executing machine-readable program instructions, as described in greater detail with regard to FIG. 8.

The computing device of 302 may include a program 304. The program 304 may be a stand-alone program on the computing device 302. In another embodiment, the program 304 may be stored on a server computing device 308. In the embodiment, the program 304 incorporates a regional manager 310 and a local manager 312. The program 304 improves device efficiency and increases safety of a user by providing dynamic selected information that correlate with a task based on proximity to a server computing device 308. In this embodiment, the program 304 transmits instructions to the regional manager 310 to receive information from the computing device 302 and download information that corresponds to a specific region. In the event that the regional manager 310 does not cover the region that corresponds with an area where the program 304 is searching, the program 304 transmits instructions to the local manager 312 to receive information from the computing device 302 and download information that encompasses the local area of the computing device 302. In this embodiment, the program 304 receives information from the computing device 302; classifies information as a task or general data; allocates the classified information to data regions; and determines how to process the classified information (shown in subsequent figure). In this embodiment, the program 304 classifies tasks and data sent from computing devices 302 based on latency, data lifetime, and data size. In this embodiment, the information that is transmitted from the regional manager 310 and the local manager 312 is map information depending on the region that the computing device 302 is currently located within. In another embodiment, the program 304 receives information from peripheral regions. In another embodiment, the program 304 receives information in the form of accident information, traffic jam information, weather information, and radio base station information. In this embodiment, the program 304 determines context and assigns weights to classified data to determine how to process the classified data (shown in subsequent figure). In another embodiment, the program 304 synchronizes the classified data in response to determining the process of the classified data.

The network 306 can be a local area network ("LAN"), a wide area network ("WAN") such as the Internet, or a combination of the two; and it may include wired, wireless or fiber optic connections. Generally, the network 306 can be any combination of connections and protocols that will support communication between the computing device 302 and the server computing device 308, specifically the program 304 in accordance with a desired embodiment of the invention. The network 306 may use an orchestration layer of 5G technology along with existing mobility monitoring tools, which senses 5G communication channels and other compatible platforms and identifies the deeper insights from data collected from 5G enabled mobile devices.

The server computing device 308 may include the program 304 and may communicate with the computing device 302 via the network 306. The server computing device 308 may be a single computing device, a laptop, a cloud-based collection of computing devices, a collection of servers, and other known computing devices. The server computing device 308 may be combined with a cloud network 306, creating a server computing device that is a cloud-based network that may be a fixed access network. In this embodiment, the combination of server computing device 308 and cloud network 306 may use radio signals, backhaul networks, optical access networks, optical metro networks, and optical core networks to relay the data from the computing device 302 to the server computing device 308 in combination with the cloud network 306. Radio signals are used to carry radio broadcasts and establish wi-fi connections for cellular devices. Backhaul networks comprise the intermediate links between a core network and the small subnetworks at the edge of the network, which in this embodiment would be the cloud-based storage capabilities of the network 106. An optical network uses single-mode optical fiber in an outside plant to require upstream and downstream signals share the same fiber on separate wavelengths.

Figure 4:
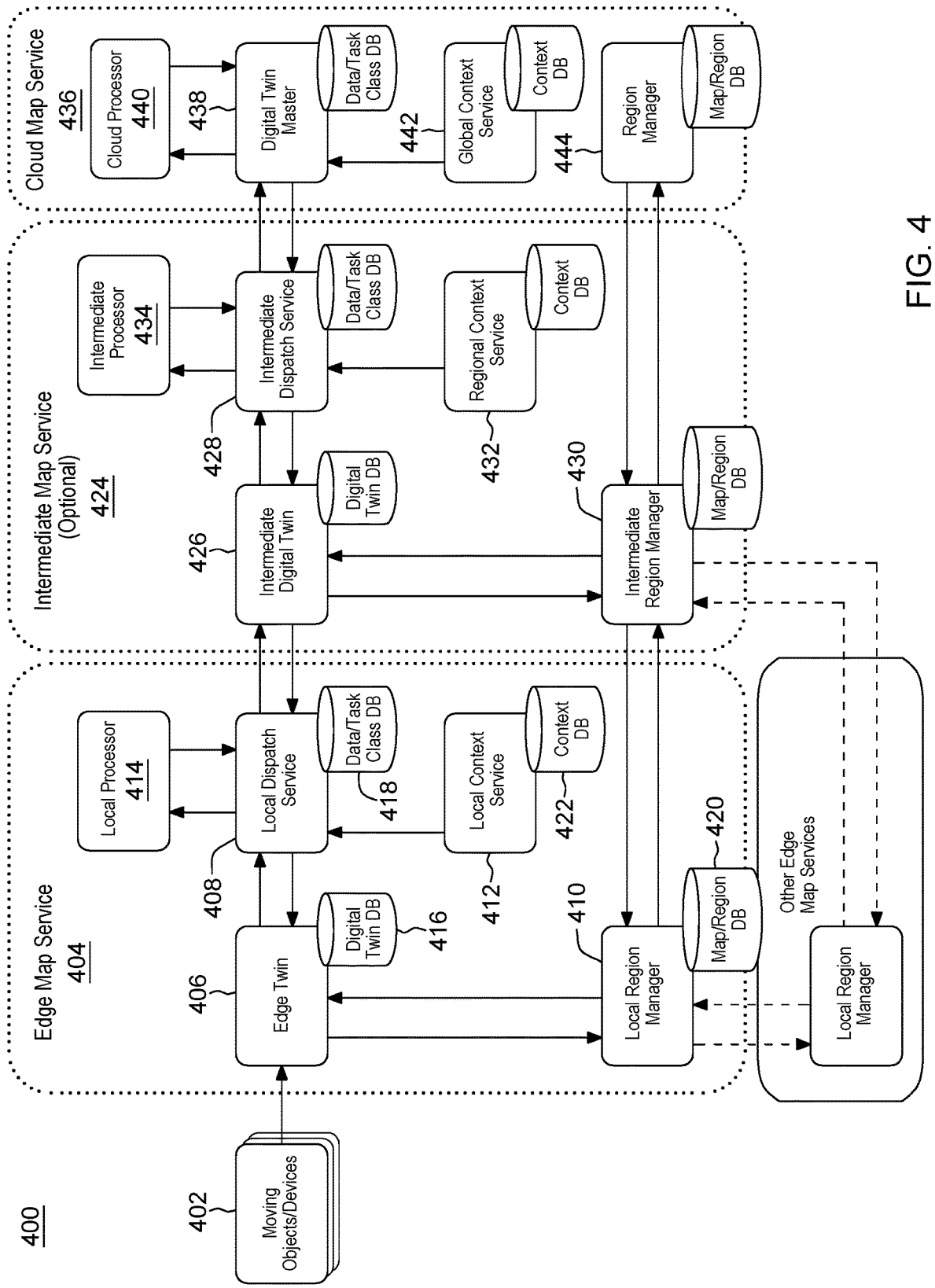
FIG. 4 is a functional block diagram illustrating an alternative computing environment, in accordance with an embodiment of the present invention.

FIG. 4 is a functional diagram illustrating of an alternative computing environment 400, in accordance with the embodiment of the present invention. In this embodiment, a computing device 402 transmits data to an edge map service server 404. The edge map service server 404 holds states of computing devices 402 depending on the region associated with the and holds contextual information related to the region. In this embodiment, the edge map service server comprises an edge twin 406 that communicates with a local dispatch service 408 and a local region manager 410. The edge twin 406 represents the state of the computing device 402 based on data received from the computing device 402. The local dispatch service 408 authenticates the state of the edge twin 406. The local region manager 410 manages the states of the edge twin 406. In this embodiment, a digital twin database 416 that is associated with the edge map service server 404 is connected to the edge twin 406. The digital twin database 416 is a database that stores the possible states of the edge twin 406. In this embodiment, a data class database 418 that is associated with the edge map service server 404 is connected to the local dispatch service 408. The data class database 418 is a database that stores multiple tasks that are based on the authenticated state of the edge twin 406. In this embodiment, a map database 420 that is associated with the edge map service server 404 is connected to the local region manager 410. The map database 420 is a database that stores maps of the region covered by the edge map service server 404. In this embodiment, the local dispatch service 408 receives data from a local context service 412 and communicates with a local processor 414. The local context service 412 transmits instructions to the local dispatch service 408 based on the authenticated state of the edge twin 406. The local processor 414 processes the authenticated state of the edge twin 406, the regional maps, and factors of the tasks associated within the edge map service server 404. In this embodiment, a context database 422 that is associated with the edge map service server 404 is connected to the local context service 412. The context database 422 is a database that stores the factors to be applied to the data to identify the task to be completed.

In this embodiment and in response to the computing device 402 needing additional information from the edge map service server 404, the computing device 402 communicates with an intermediate map service server 424. The components of the intermediate map service server 424 perform similar functions to their correlating counterparts found in the edge map service server 404. In this embodiment, the components of the intermediate map service server 424 perform functions when data is not found within the edge map service server 404. In this embodiment, the intermediate map service server 424 comprises an intermediate digital twin 426 that communicates with the computing device 402, an intermediate dispatch service 428, and an intermediate region manager 430. In this embodiment, the intermediate region manager 430 communicates with the local region manager 410. In this embodiment, a digital twin database 416 that is associated with the intermediate map service server 424 is connected to the intermediate digital twin 426. In this embodiment, a data class database 418 that is associated with the intermediate map service server 424 is connected to the intermediate dispatch service 428. In this embodiment, a map database 420 that is associated with the intermediate map service server 424 is connected to the intermediate region manager 430. In this embodiment, the intermediate dispatch service server 424 receives data from a regional context service 432 and communicates with an intermediate processor 434. In this embodiment, a context database 422 that is associated with the intermediate map service server 424 is connection to the regional context service 432.

In this embodiment and in response to the computing device 402 communicating with the intermediate map service server 424, the computing device 402 communicates with a cloud map service server 436. The components of the cloud map service server 436 perform similar functions to the components of the edge map server 404. In this embodiment, the cloud map service server 436 comprises a digital twin master 438 that communicates with intermediate dispatch service 428 and a cloud processor 440 and receives data from a global context service server 442. The digital twin master 438 represents the final state of the cloud map service server 436. The global context service server 442 applies factors to the data received by the digital twin master 438. The cloud processor 440 processes the data received by the digital twin master 438 with the applied factors of the global context service server 442, while preforming a query on the map database 420 that houses every regional map. In this embodiment, the cloud map service server 436 comprises a region manager 444, and the region manager 444 communicates with the intermediate region manager 430. In this embodiment, a data class database 418 that is associated with the cloud map service server 436 is connected to the digital twin master 438. In this embodiment, a context database 422 that is associated with the cloud map service server 436 is connected to the global context service server 442. In this embodiment, a map database 420 that is associated with the cloud map service server 436 is connected to the region manager 444.

Figure 5:
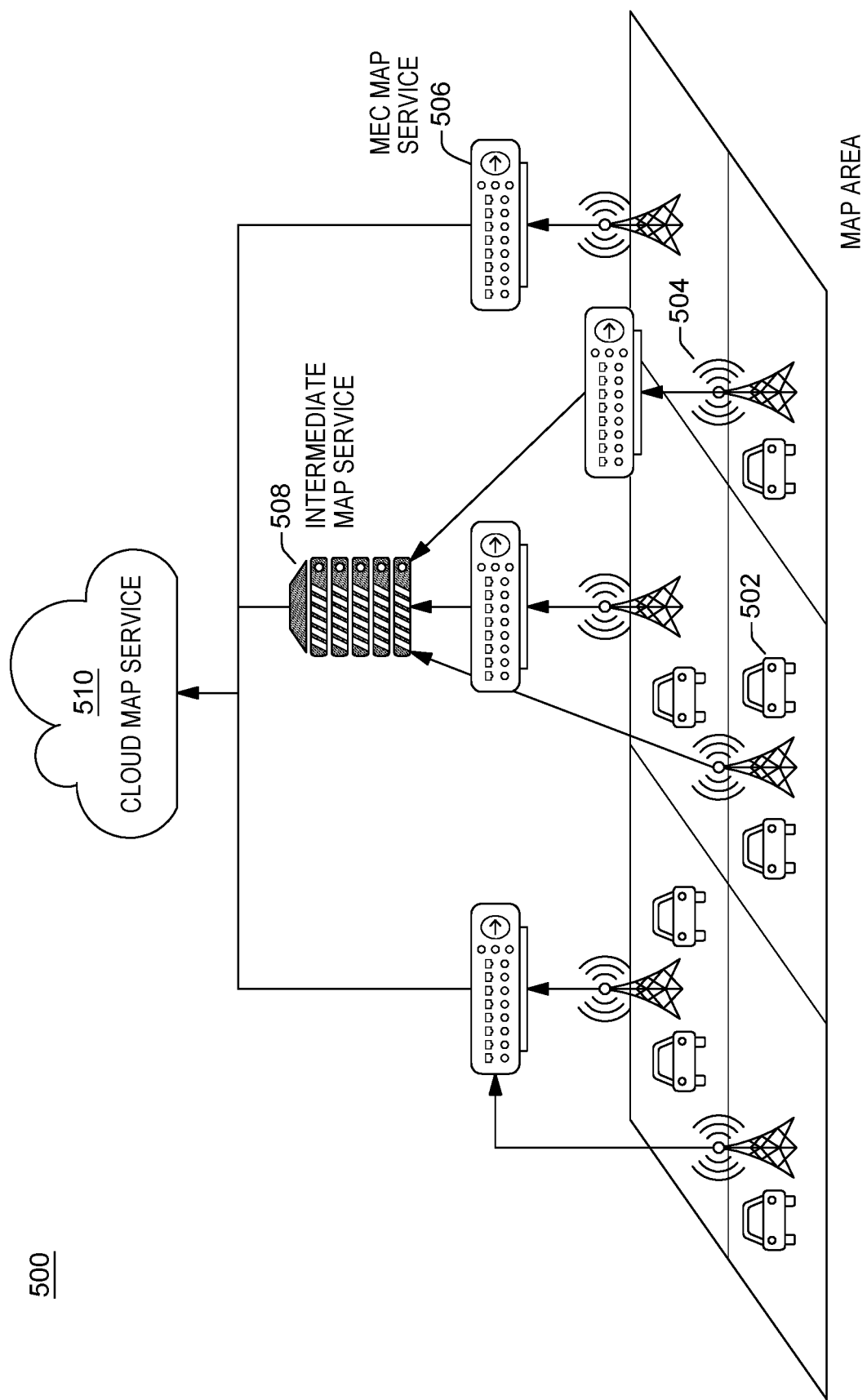
FIG. 5 is a functional block diagram illustrating a cloud determined mapping service environment, in accordance with an embodiment of the present invention.

FIG. 5 is a functional block diagram 500 illustrating a cloud determined mapping service environment, in accordance with an embodiment of the present invention. In this embodiment, computing devices 502 communicate with radio signal towers 504 to transmit location and receive information. In this embodiment, the information comprises mapping information and local information. For example, the computing device 502 is a smart car, and the information received is accident information, traffic jam information, weather information, and radio base station information. In this embodiment, the radio signal towers 504 communicate with Multi-Access Edge Computing ("MEC") servers 506. The MEC servers 506 transmit and receive information between the radio signal towers 504 and an intermediate data server 508. In this embodiment, the MEC servers 506 may have information locally stored within to transmit information back to the radio signal towers 504. In another embodiment, the MEC servers 506 may transmit locally stored information directly to the computing device 502. In this embodiment, the intermediate data server 508 communicates with the MEC servers 506 and a cloud data server 510. In this embodiment and in response to the MEC server 506 not having the information locally stored, the intermediate data server 508 communicates with the cloud data server 510 to retrieve information for a predetermined map area 514. In this embodiment, the cloud data server 510 accesses a database that stores information on multiple MEC servers located within the predetermined map area 514 and outside the predetermined map area 514. In this embodiment, the predetermined map area 514 is a specific region near the computing device 502. In another embodiment, the cloud data server 510 holds map regions where MEC servers 506 overlap with each other. In another embodiment and when there is a region not covered by MEC servers 506, the intermediate data server 508 covering a wider area may be deployed between the MEC server 506 and the cloud data server 510.

Figure 6:
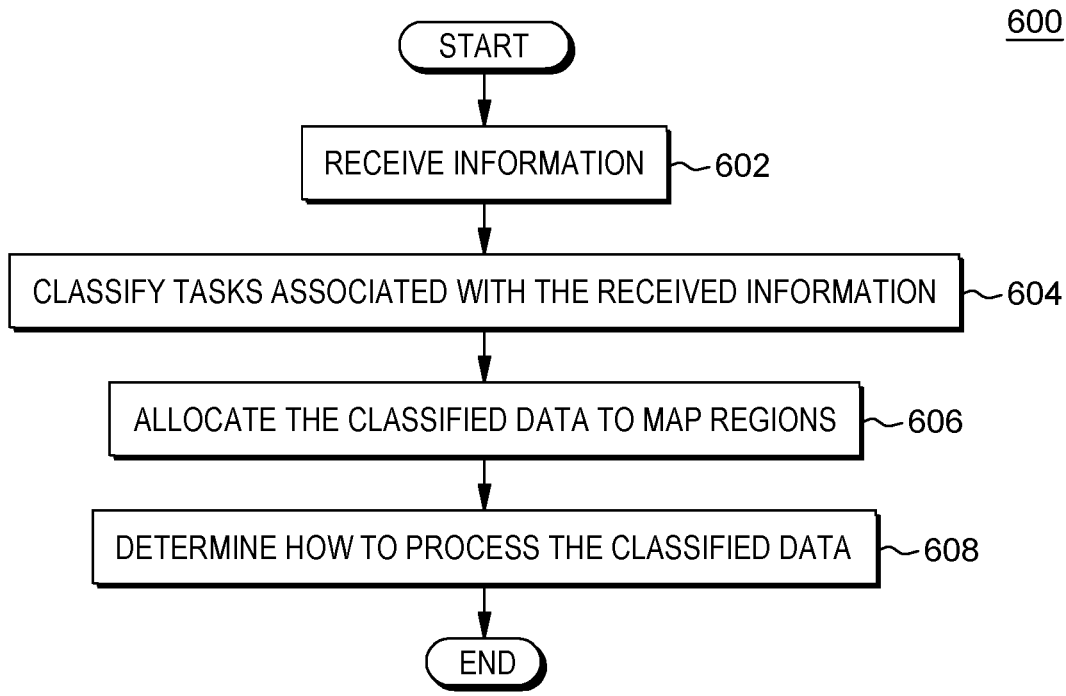
FIG. 6 is a flowchart illustrating the operational steps to dispatch tasks in a MEC environment, in accordance with an embodiment of the present invention.

FIG. 6 is a flowchart 600 illustrating the operational steps to dispatch data in a MEC environment, in accordance with at least one embodiment of the present invention. In this embodiment, the program 304 dispatches data to computing devices 302 within the MEC environment by receiving information, classifying data as a task, allocating the classified data to map regions, and determining the process of the classified data.

In step 602, the program 304 receives information from the computing device 302. In this embodiment, the program 304 receives information from the computing device 302 by determining the location of the computing device 302 by using global positioning system ("GPS") algorithms. In this embodiment, the program 304 receives information in the form of data. For example, the program 403 receives the specific location of the smart car and the preferred destination. In other embodiments, the program 304 can receive information from one or more other components in computing environment 300.

In step 604, the program 304 classifies tasks associated with the received information. In this embodiment, the program 304 classifies data from the received information from the computing device 302 based on factors. In this embodiment, the factors include latency, data lifetime, and data size. Latency is defined as the time it takes for data to be stored or retrieved. Data lifetime is defined as the time it takes for data to survive being cleared or destroyed. In this embodiment, the program 304 classifies data based on the factors as either a task or general data. In this embodiment, the program 304 has predetermined tasks stored locally and in response to receiving data packets, the program 304 identifies certain features from the data packets and identifies the task needed to be performed from the metadata included in the received data packets. For example, and in response to receiving a data packet, the program 304 identifies GPS coordinates, location information of a device, location information associated with a destination, and route information. Based on the identified metadata, the program 304 identifies the data packet as a navigation task. In another embodiment and in response to the program 304 receiving information that does not correlate with a predetermined task, the program 304 classifies the received information as general data. For example, the program 304 classifies the received information as a navigational task of directing the smart car from Location A to Location B.

In step 606, the program 304 allocates the classified tasks to map regions. In this embodiment and in response to classifying tasks associated with data, the program 304 allocates the classified tasks by identifying a current location of the computing device 302, accessing a map that is divided into regions, identifying the region that the computing device 302 is located, and notating within the accessed map that the computing device 302 is within that region. In this embodiment, the program 304 uses GPS algorithms to locate the computing device 302 and proximate map regions. In this embodiment, the program 304 locates alternate processing locations based on a pre-defined area with a radius surrounding the computing device 302. In this embodiment and in response to the classified data being a predetermined task, the program 304 allocates the classified data to map regions located to the current position of the computing device 302 and the estimated final position of the computing device 302. For example, the program 304 locates the smart car completing a trip using navigational directions and allocates the information from the smart car to map regions that are located near the smart car's current position and map regions located along the predicted route of the smart car.

In step 608, the program 304 determines how to process the classified tasks. In this embodiment and in response to allocating the classified data to a map region, the program 304 analyzes the allocated map regions, determines context of the classified tasks, and assigns weight to determined context of the classified data. In this embodiment, the program 304 can then process the tasks according to the determined context in the allocated region. This step will be further explained in a subsequent figure. In this embodiment, the program 304 dispatches the classified task to other server computing devices 308 located in another allocated region as a determination of how to process the classified task based on contextual factors. In this embodiment, the program 304 analyzes the allocated map regions by inspecting digital agents associated with a specific region of a map that is deployed in a MEC server and its peripheral region that were allocated to the computing device 302. For example, the program 304 inspects the list of regions that were allocated in step 606 and nearby regions by inspecting a database that houses the activity of the map regions. In this embodiment, the program determines context of the classified data by inspecting the digital database associated with the allocated region to determine the request of the classified information. For example, the program 304 determines the context of the classified data seeks accident information within the region, traffic jam information within the region, weather information within the region, and radio base station information within the region. In this embodiment, the program 304 assigns weight to the classified data based on the determined context and the factors applied in step 604. For example, the program 304 assigns a value or weight for classified data based on the determined task, latency of the data, retention of the data, volume of the data, and any conditions associated with the classified data.

Figure 7:
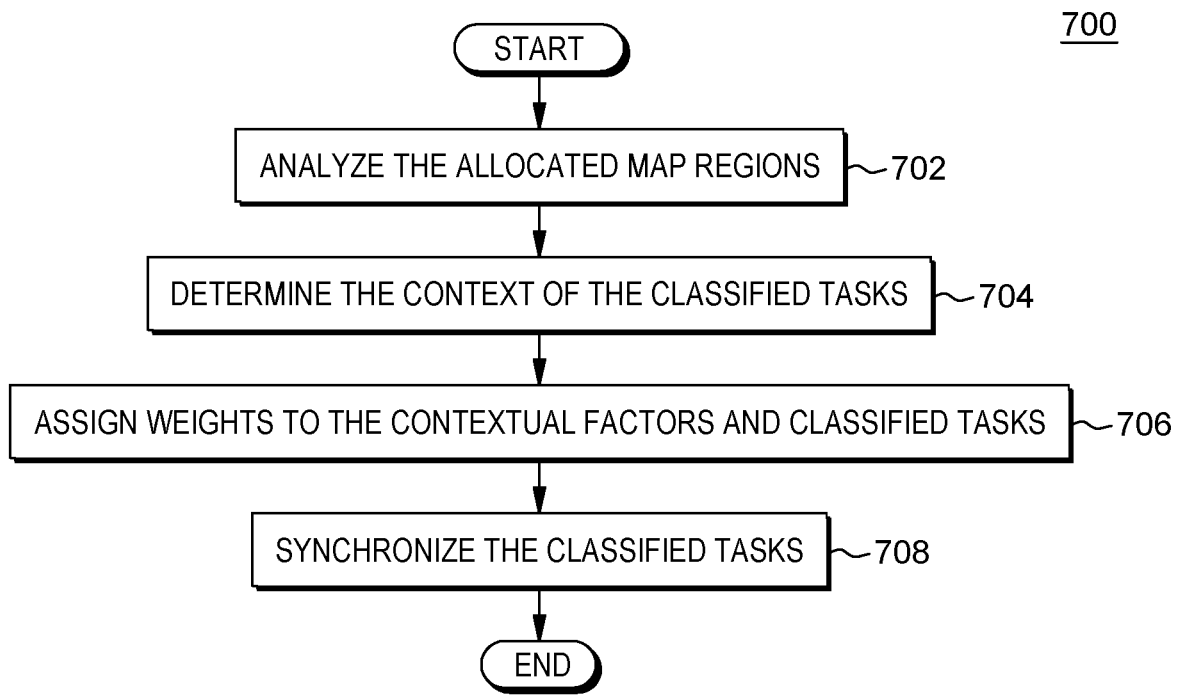
FIG. 7 is a flowchart illustrating the operational steps to determine how to process the classified tasks associated with data, in accordance with an embodiment of the present invention.

FIG. 7 is a flowchart 700 illustrating operational steps to determine how to process the classified tasks associated with data, in accordance with the present invention.

In step 702, the program 304 analyzes the allocated map regions. In this embodiment, the program 304 analyzes the allocated map regions to determine and narrow the area that the computing device 302 is sending data from. In this embodiment, the program 304 uses machine learning algorithms and artificial intelligence algorithms to analyze the allocated map regions to locate the computing device 302. The analysis of the allocated map regions provides details on the specific server computing device 308 that will be used to provide contextual information on the data sent from the computing device 302. For example, the program 304 analyzes the allocated map regions that relate received information that details the current location of the smart car based on the map region the smart car is currently located within.

In step 704, the program 304 determines the context of the classified tasks. In this embodiment and in response to the analysis of the allocated map regions, the program 304 determines the context of the tasks by applying contextual factors to the data to produce a classified task. In this embodiment, the program 304 uses a determination engine to determine contexts for multiple pre-saved classified tasks. In this embodiment, the program 304 uses the determination engine to analyze a context database, which stores information to identify data packets based on received information, determines the contexts based on the analysis of the context database, and modifies the severity of the classified task based on the determination of the context. The context databases stores weight values for multiple factors and actions and details regarding escalation and de-escalation of severity. The program 304 applies contextual factors based on a determination of severity for that correlates with an escalation condition. Contextual factors are the details that are stored within the context database and assists the program 304 in modifying the severity of the classified task based on these contextual factors. In this embodiment, the program 304 applies contextual factors allows the program 304 to assign weights for the classified tasks. In this embodiment, the program 304 adds the assigned weights of the classified task to determine an overall weighted score of the classified task. The program 304 determines the severity of the classified task by calculating the overall weighted score. The program 304 identifies each detail of the classified task and assigns a value based on the stored value information found in the context database. For example, the program 304 performs a query within the context database to determine the values of latency, retention, and volume for the identified task based on the received information. In another embodiment and in response to receiving feedback from a processing location, the program 304 alters portions of the classified task to include additional processing instructions using alternate mapping regions and respectively associated processing locations. In this embodiment, the program 304 alters portions of the classified task by modifying the classified task to avoid an object.

The program 304 maintains a range, e.g. a user-defined value with a minimum of 1 and a maximum of 10, for the overall weighted score with multiple predetermined thresholds to dynamically modify the score of the classified task. In this embodiment, the program 304 classifies a task as low severity in response to calculating the overall weighted score less than 4; normal severity in response to calculating the overall weighted score as equal to greater than 4 but less than 7; and high severity in response to calculating the overall weighted score as equal to or greater than 7 to 10, which is the maximum severity of a classified task. In this embodiment, the program 304 quantifies the overall weighted score by its placement on a user-defined scale. In this embodiment, the program 304 aggregates initial weighted scores to calculate the overall weighted score. In another embodiment, the program 304 determines the context of the data, wherein there is a first allocation based on raw data and a reallocation based on determined context and classification. In this embodiment, the program 304 re-allocates or redistributes to a different server computing device 308, or a processing location, to dynamically receive data. For example, car 1 has a navigation task, and the navigation task currently has no weather input. This system reads the navigation task and allocates the processing to tower 1. Then the program 304 transmits instructions to the navigation task to receive weather input and crowdsourced information about a crash. The program 304 identifies the transmitted instructions, reads the car's speed, current location, predicted future location and then redistributes the processing of the navigation task (e.g., efficient routing) to take into account the crash and the weather to either tower 2 or a combination of tower 1, 2, and maybe 3. The escalation condition may be a contextual factor that elevates the severity of the classified task. For example, the program 304 applies the basis of the data class, digital twins, and contextual factors to the received data to form a final task that becomes the classified task.

In step 706, the program 304 assigns weights to the contextual factors and details of the classified tasks. Please see Table 1 below.

TABLE 1

| Data | Task | Latency (RTT) | Retention | Volume | High/Low Severity Escalation Conditions with Contexts |
|---|---|---|---|---|---|
| Car Probe | Detection of tail end of traffic jam | <10 sec | <10 min | small | |
| Image | Detection of obstacle | <5 sec | <5 min | mid | Accident information present in the neighborhood (escalation) |
| Car Probe | Detection of theft | <5 min | <1 day | small | |
| Event | Notification of accident | <10 sec | <6 hour | small | Something unusual present in the data of own vehicle (high) |
| Event | Notification of heavy rain | <1 min | <1 hour | small | Warning has been issued in the neighborhood (high) |
| Car Probe/Image | Notification of dangerous vehicle | <20 min | <1 hour | large | |
| Point Cloud/LiDAR | Detection of map change point | <30 min | n/a | large | Backend networks are congested or are connected with a 4-G radio base station (Low) |

In this table, the program 304 assigns a weight based on the latency, retention, volume of the data, and the severity associated with the data. Latency is the time it takes for data packets to be stored or retrieved. In this embodiment, latency is measured in using a linear timeline and can be configured to measure any length of time. For example, in this embodiment, latency can be measured in seconds and minutes. In other embodiments, latency can be measured with more or less granularity. Round-trip Time ("RTT") latency is the time it takes for a data packet to go from the sending endpoint to the receiving endpoint and is measured in seconds, minutes, and hours. Retention is the continued storage of data for compliance or business reasons and measures the length of time the data is stored. Retention is measured in seconds, minutes, hours, and days. In this embodiment, retention is measured using a linear timeline and can be configured to measure any length of time. For example, in this embodiment, retention can be measured in seconds, minutes, hours, and days. In other embodiments, retention can be measured with more or less granularity. The volume of the data is classified as small, mid, or large, and this classification is based on the size of the data packet being assigned and is placed on a range of bytes from megabytes to terabytes. A small volume is defined as a data packet that is less than 10 gigabytes ("GB"). In this embodiment, the program 304 classifies data packets as small volume when the data is in a format that is accessible, informative and actionable. Large volume is defined as a data packet is larger than a terabyte ("TB"). In this embodiment, the program 304 classifies a data packet as a large volume when the data is a massive chunk of unstructured data. In the embodiment, the program classifies data packets as a mid-volume when the data packet is defined as a data packet that is neither classified as a large volume or a small volume. For example, in this table, the program 304 detects a data packet and classifies it as a car probe. The program 304 then identifies the task associated with the received data packet as a detection of a tail end of a traffic jam. The program 304 then identifies the values of contextual factors (e.g., latency, retention, and volume) of the received data packet of the task by comparing the information received from the determination of the classified task and the analysis of the contextual factors.

In step 708, the program 304 synchronizes the classified tasks based on contextual factors, escalation factors, and overall weighted scores. In this embodiment and in response to the assigned weights of classified tasks requiring orchestration, the program 304 synchronizes the classified tasks by selecting a predefined method that coordinates data between the server computing devices 308 and determining the specific map service location to be performed based on the method. This step will be further explained in another figure. In this embodiment, the program 304 receives the analysis of the contextual factors associated with the classified task and generates a weighted score based on those factors. This generated weighted score is the same range as the overall weighted score and maintains the same categories. The program 304 then communicates with the server computing devices 308 located near the computing device 302 to determine whether escalation factors are present. Escalation factors are factors that can modify the severity of the classified task. Example of escalation factors are high speed roads, accident information, and weather warnings. In this embodiment, the program 304 then calculates a final overall weighted score based on the analysis of the contextual factors and the determination of the escalation factors. In this embodiment, the predetermined methods of synchronization are processes of establishing consistency among data from a source to a target data storage and vice versa. Examples of predetermined methods of synchronization are write-arounds, write-backs, write-locals, write-shadows, write-summaries, and write-through-endpoints. In this embodiment, the program determines the specific map service location based on the severity associated with the task.

In this embodiment, the program 304 synchronizes the data to ensure that classified tasks with a high severity designation are transmitted before classified tasks with low severity based on associated map regions. In another embodiment, the program 304 synchronizes the classified task by identifying a score associated with at least one portion of the task; identifying a placement of the score on a scale used to determine rank of portions of the classified task; and identifying an alternate sequence of the classified task based on the placement of the score.

Figure 8:
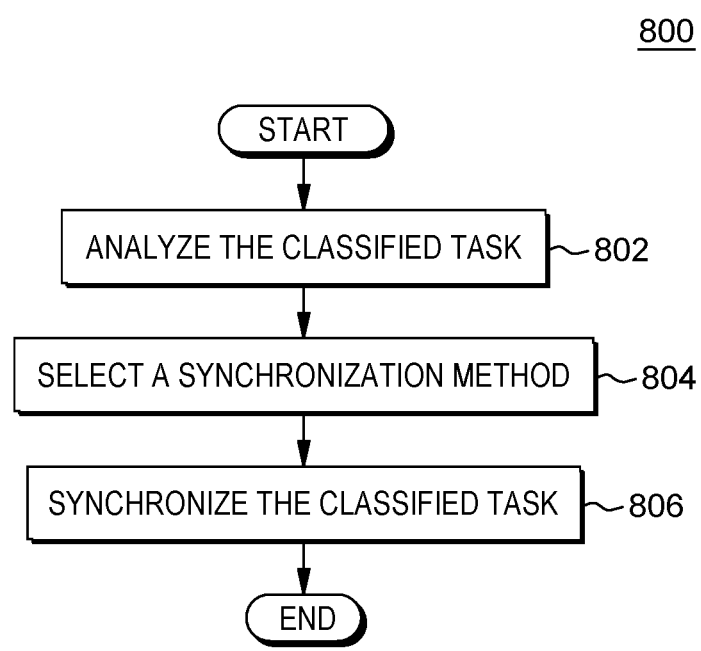
FIG. 8 is a flowchart illustrating operational steps to synchronize the classified tasks with contextual factors, in accordance with an embodiment of the present invention.

FIG. 8 is a flowchart 800 illustrating operational steps to synchronize the classified tasks with contextual factors, in accordance with at least one embodiment of the present invention.

At step 802, the program 304 analyzes the classified task. In this embodiment, the program 304 analyzes the classified task to determine the appropriate predefined synchronization method to select. In this embodiment, the program 304 uses the determination algorithm to analyze the details of the classified task and the pre-saved and predetermined synchronization method that correlates with the classified task. In this embodiment, the program 304 analyzes the classified task to determine the severity of the task. The program 304 receives the analysis of the contextual factors associated with the classified task to generate a general weighted score for the severity of the classified task. The program 304 then communicates with the server computing devices 308 near the computing device to determine the presence of any escalation factors. In response to receiving the analysis of the contextual factors and the determination of escalation factors, the program 304 calculates a final overall weighted score, which is based on the severity of the classified task. In this embodiment, the program 304 compares the contextual factors received to the pre-saved factors that are associated with the data. This comparison provides details on the determination of the severity of the classified task. The program 304 then examines the escalation factors provided via the server computing devices 308 to identify information that would modify the determination of the severity of the classified task. For example, the program 304 identifies the classified task as a detection of an obstacle that has a general weighted score of 3 based on its latency, retention, and volume size. The program 304 then receives additional accident information from the MEC server in the area, and the additional information escalates the severity of the detection of the obstacle to 5 because the program 304 identified the obstacle as an accident. In this example, the program 304 initially generated a weighted score of 3, which is defined as low severity, but the additional information received from MEC servers escalated the final overall weighted score to 5, which is defined as normal severity. The analysis of the classified task provides additional information to assist the program 304 in the selection of a synchronization method. For example, the program 304 analyzes the details of the task and determines that the task is a detection of theft and the pre-saved synchronization method that correlates with that classified task is a write-around method.

At step 804, the program 304 selects a synchronization method. In this embodiment, the program 304 selects the synchronization method based on the analysis of the classified task, the allocated map region, and the contextual factors of the classified task. Table 2 is an example of the program 304 synchronization method. Please see Table 2 below.

TABLE 2

| Method | Data/Task Transmission Method | Example of Task |
|---|---|---|
| Write-around | Transmit the task to a cloud or to another MEC server that overlaps an extended region | Detection of theft |
| Write-back | Hold the task in the local MEC server and transmit the task to a cloud and another MEC server asynchronously | Sharing accident information |
| Write-local | Hold the task in only the local MEC server | Volatile data such as information about animal/people on the road |
| Write-shadow | Transmit a pointer represented that data is present in the local MEC server to a cloud and another MEC server | Information about current location of device |
| Write-summary | Transmit processed data such as statistical information and annotated map information without transmitting raw data | Dynamic map update and detection of obstacle |
| Write-through-endpoint | Instruct the transmission source to transmit the task to another MEC server from an endpoint | Point cloud information |

A write-around method ensures the core is completely in sync with the backend storage. In this embodiment, the program 304 selects this method to transmit the classified task to a server computing device 308 that overlaps with an extended allocated map region. An example of the program 304 selecting the write-around method is for a detection of theft. A write-back method moves data from one server computing device 308 to another server computing device 308. In this embodiment, the program 304 performs this method to store the classified task on the local server computing device 308 and transfers the classified task to a cloud server computing device 308 and another computing device 308 asynchronously. An example of the program 304 selecting the write-back method is for sharing accident information. A write-local method transfers data when the computing device 302 and the server computing device 308 are side-by-side. In this embodiment, the program 304 performs the write-local method to store the classified task locally within the server computing device 308. An example of the program 304 selecting the write-local method is for volatile information about animal or people on the road. A write-shadow method streams data stored on a local server to a regional server or cloud server. In this embodiment, the program 304 performs the write-shadow method by transmitting data to a cloud server computing device 308 and another server computing device 308 that is present on the local server computing device 308. An example of the program 304 selecting the write-shadow is for information about the current location of the smart cart. A write-summary method transmits only structured data. In this embodiment, the program 304 performs the write-summary method by transmitting processed data (e.g., statistical information and annotated map information) without transmitting raw data. An example of the program 304 selecting the write-summary method is for dynamic map update and detection of an obstacle. A write-through-endpoint method a method to copy data by using endpoints. For example, a connected vehicle is in the area in a MEC server computing device 308. The program 304 transmits instructions to the MEC server computing device 308 to detect a need to write data by using write-through-endpoint and to issue an operation, that data copies to another MEC server computing device and to the connected smart car. The program 304 copies the data when the smart car moves to another MEC server computing device and realizes to copy data from cloud server computing device 308 to cloud computing device 308, instead of connecting directly one-by-one. In this embodiment, the program 304 performs the write-through-endpoint method by instructing the transmission source to transmit the classified task to another server computing device 308. An example of the program 304 selecting the write-through-endpoint method is point cloud information. For example, in this table, the program 304 identifies the task a detection of theft and selects the method of a write-around synchronization. The program 304 then transmits the task to cloud server computing device 308 or a regional server computing device 308 that overlaps an extended region of an allocated map region.

At step 806, the program 304 synchronizes the classified task. The program 304 performs the selected synchronization method. In this embodiment, the program 304 performs the selected synchronization method by using the synchronization method determination algorithm to perform the method based on the classified task and the severity of the contextual factors associated with the classified task. In this embodiment, the program 304 modifies the severity of the classified task based on the selected synchronization method and the associated severities based on escalation factors, contextual factors, and overall weighted scores. In this embodiment, the program 304 recognizes three levels of severity, which are high, normal, and low. The program 304 uses the synchronization method determination algorithm to modify the severity associated with the classified task, which would lead to a specific synchronization method being selected. In this embodiment, the program 304 transmits instructions to the synchronization method determination algorithm to analyze the contextual factors associated with the classified task. The program 304 then transmits instructions to the synchronization method determination algorithm to determine the presence of escalation factors for the classified task. The program 304 then transmits instructions to calculate the overall weighted score for the classified task and determine the severity of the classified task. In this embodiment, the program 304 identifies a latency threshold, a retention threshold, and a volume threshold for the classified task based on the pre-saved contextual factors associated with the classified task. In one embodiment, program 304 transmits instructions to the synchronization method determination algorithm to identify escalation factors based on data meeting or exceeding the predetermined threshold for the contextual factors. In another embodiment, the program 304 transmits instructions to the synchronization method to identify escalation factors based on received information from the server computing device 308. For example, the program 304 receives additional information on the classified task from the MEC servers located on the road that the smart car is currently located, and the additional information is the basis of the escalation factors. In this embodiment, the program 304 uses the synchronization method determination algorithm to determine the synchronization method based on the severity associated with the classified task. For example, the program 304 uses a high severity synchronization method when the data of the classified task exceeds the latency threshold and identifies escalation factors. The program 304 also uses a high severity synchronization method when the data of the classified task does not meet the latency threshold, exceeds the retention threshold, exceeds the volume threshold, and identifies escalation factors. In another example, the program 304 uses a normal severity synchronization method when the data of the classified task does not meet the latency threshold, exceeds the retention threshold, and identifies escalation factors. In another example, the program 304 uses a normal severity synchronization method when the data of the classified task does not meet the latency threshold, does not meet the retention threshold, exceeds the volume threshold, and identifies escalation factors. In another example, the program 304 uses a low severity synchronization method when the data of the classified task does not meet the latency threshold, does not exceed the retention threshold, does not meet volume threshold, and does not identify escalation factors. In another example, the program 304 uses a low severity synchronization when the data of the classified tasks meets or exceeds at least one threshold but does not identify escalation factors.

FIG. 9 is an example 900 of the application of the selected synchronization method, in accordance with at least one embodiment.

Figure 9A:
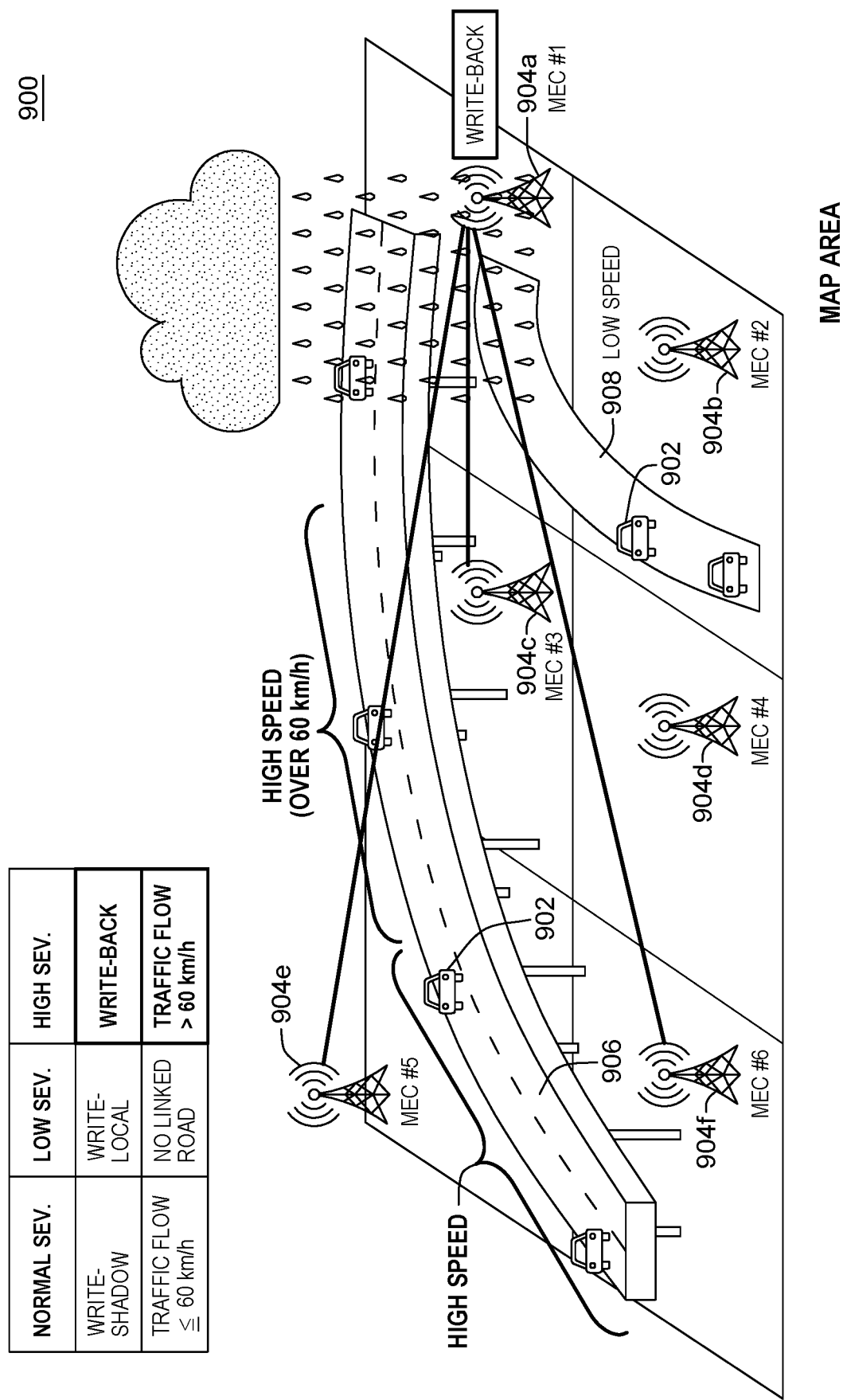
FIG. 9A-C are example illustrations of the application of the selected synchronization method, in accordance with an embodiment of the present invention.

FIG. 9A illustrates an example of the program 304 selecting the synchronization method based on contextual factors of the classified task. In this example, there are two cars on the road. Specifically, one car is traveling on a highway and another car is on a local road, beginning to merge on the highway. Both of these cares are heading towards an area where there is rain. There are six MEC servers around designated regions or zones around the roads where the cars are driving.

In this embodiment, a computing device 902 communicates with MEC server computing devices 904*a*-904*f*. In this embodiment, there is a high-speed road 906 and a low-speed road 908. In this embodiment, the program 304 determines that different contextual factors exist for the computing device 902 located on the high-speed road 906 than the computing device 902 located on the low-speed road 908. In this embodiment, the program 304 communicates with the MEC server computing devices 904*a*-904*f* to identify the presence of escalation factors. In this embodiment, the program 304 analyzes the contextual factors and identifies the presence of escalation factors to determine the severity of the classified task and calculate the overall weighted score. This determination modifies the synchronization method selected by the program 304. Please see table 3.

TABLE 3

| Normal Severity | Low Severity | High Severity |
|---|---|---|
| Write-shadow | Write-local | Write-back |
| Traffic flow ≤ 60 hm/h | No linked road | Traffic flow > 60 km/h |

In this embodiment, the program 304 transmits data packets detailing the classified task to at least one MEC server computing device 904*a*-904*f* that encompasses the current location of the computing device 902. In this embodiment, the program 304 receives input from a MEC server computing device 904*a*-904*f* that is determined to correlate with the classified task via the determination engine performed by the regional manager. In this embodiment, the program 304 selects a synchronization method based on the classified task, received input, and contextual factors. For example, the program 304 determines that the classified task is a heavy rain notification. The severity of the heavy rain and the location of the heavy rain escalates the severity of the classified task, and the program 304 modifies the synchronization method selected for the classified task. In the example, the program 304 communicates with MEC server computing devices 904*a*, 904*c*, 904*d*, 904*e*, and 904*f* located near the smart car and identifies heavy rain on a high-speed road 906, and the severity of the rain and the location of the heavy rain on a high-speed road 906 escalates the severity of the notification from normal severity to high severity. The program 304 then selects the write-back synchronization method to synchronize the classified task based on the severity of the classified task. In this example, the program 304 communicates with the MEC server computing devices 904*a* and 904*b* to select the synchronization method that corresponds with the severity of the computing device 902 that is located on the low-speed road 908. This example will be discussed in greater detail in example 9B.

Figure 9B:
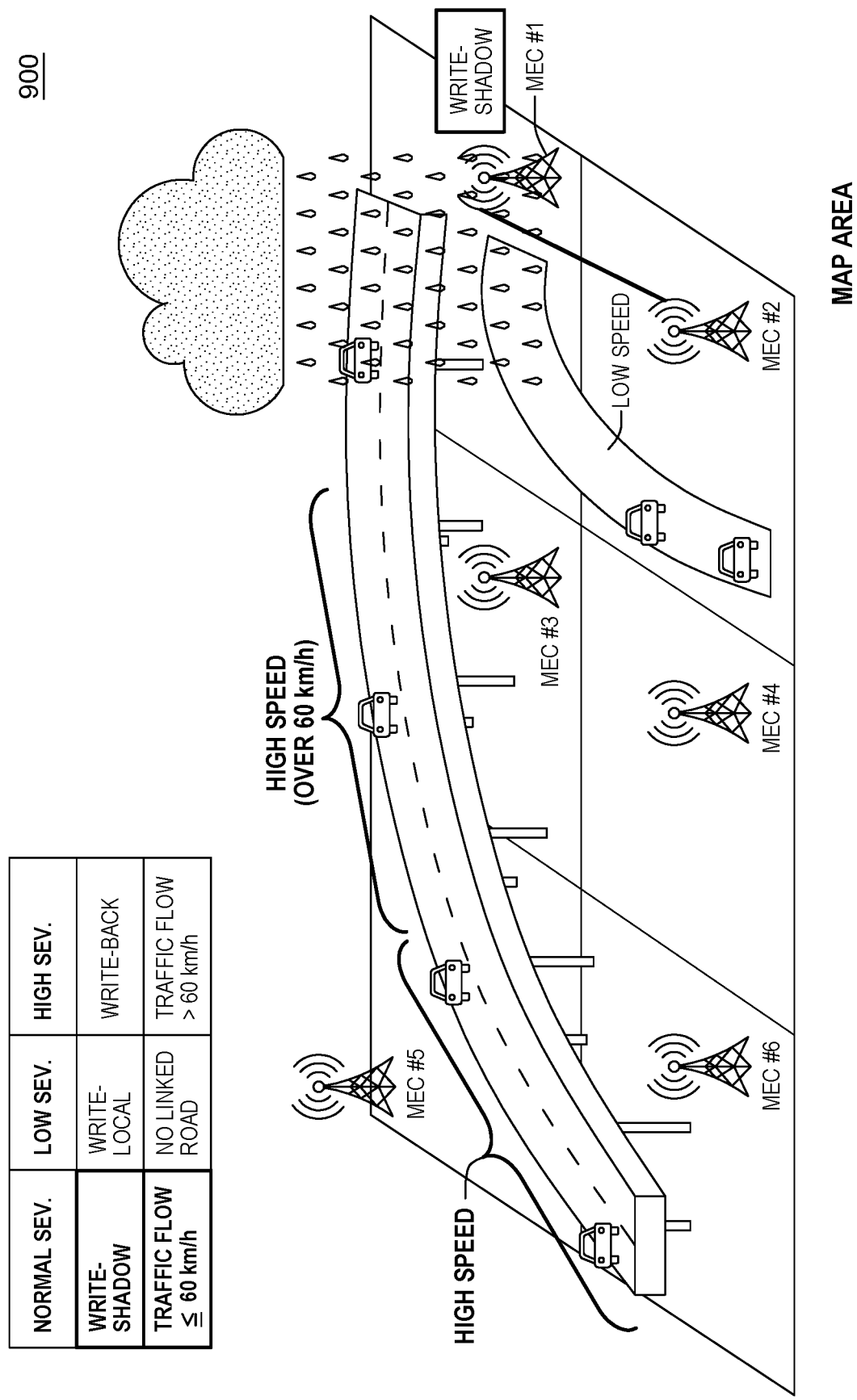

FIG. 9B illustrates an example of the program 304 selecting the synchronization method based on contextual factors for the classified task. In this example, there are two cars on the road. Specifically, one car is traveling on a highway and another car is on a local road, beginning to merge on the highway. Both of these cares are heading towards an area where there is rain. There are six MEC servers around designated regions or zones around the roads where the cars are driving.

In this example, the program 304 communicates with the MEC server computing devices 904*a* and 904*b* that are located on the low-speed road 908. In this example, the program 304 locates the computing device 902 on the low-speed road 908 and receives a notification of escalation factors, (e.g., heavy rain) from the MEC server computing devices 904*a* and 904*b*. In this example, the program 304 classifies the task, analyzes the contextual factors associated with the classified task, and calculates the overall weighted score based on the presence of escalated factors, the analysis of the contextual factors, and the selected synchronization method. For example, the program 304 locates the smart car on the low speed road 908, which maintains the traffic flow is less than 60 km/h. In this example, the program 304 determines the severity of the classified task is normal severity and selects the write-shadow synchronization method based on the analysis of the contextual factors and escalation factors received from MEC server computing devices 904*a* and 904*b*. In another example, the program 304 selects a low severity synchronization method in response to a road not linking MEC server computing devices 904*a*-904*f*. This will be further explained in another example.

Figure 9C:
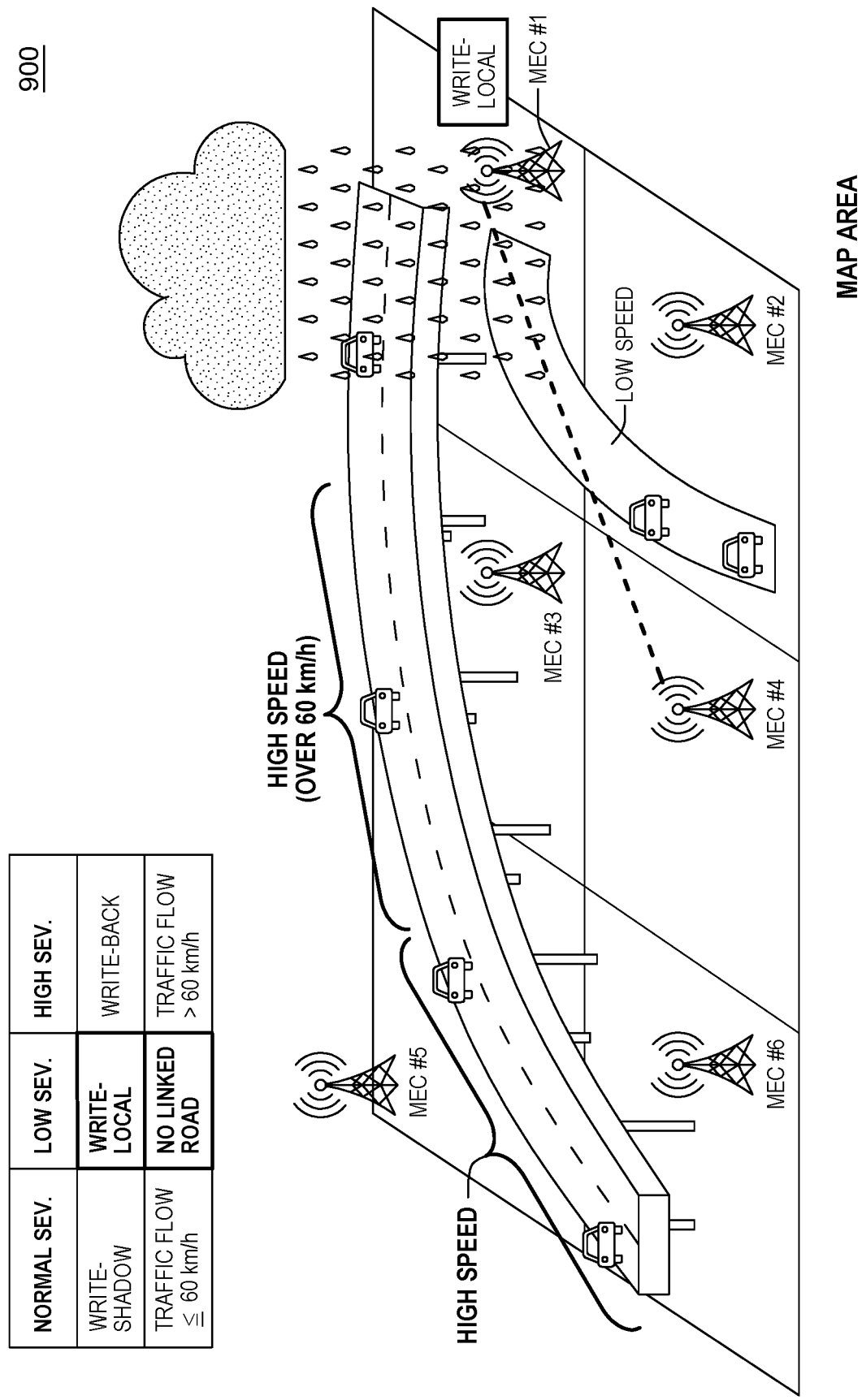

FIG. 9C illustrates an example of the of the program 304 selecting the synchronization method based on contextual factors for the classified task. In example 9C, the same fact pattern exists. In this example, the program 304 communicates with MEC server computing devices 904*a* and 904*d* to identify escalation factors that exist in the area located near each MEC server computing device 904*a*-904*f*. In this example, the program 304 determines that neither the high-speed road 906 or the low-speed road 908 connect the area between the MEC server computing devices 904*a* and 904*d*. In this example, the program 304 locates the computing device 902 and receives a notification of escalation factors (e.g., heavy rain) from a MEC server computing device 904*a*. In this example, the program 304 classifies the task, analyzes the contextual factors associated with the classified task, and calculates the overall weighted scored based on the presence of escalated factors, the analysis of the contextual factors, and the selected synchronization method. For example, the program 304 determines that there is no road that links the MEC server computing devices 904*a* and 904*d*. In this example and in response to determining that there is no road that links the MEC server computing devices 904*a* and 904*d*, the program 304 determines the severity of the classified task as low severity and selects the write-local synchronization method based on the analysis of the contextual factors and escalation factors received from MEC server computing devices 904*a* and 904*d*.

Figure 10:
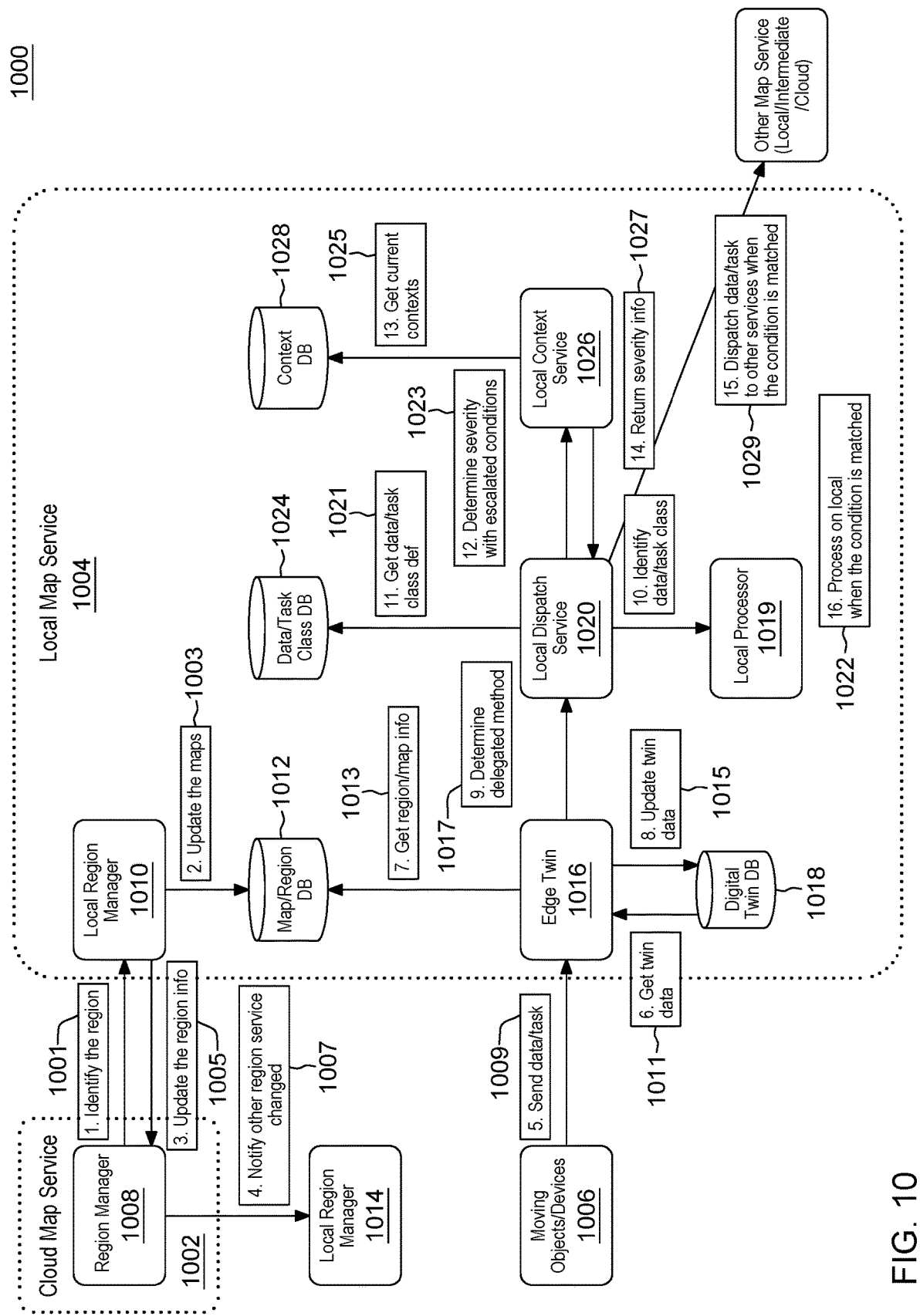
FIG. 10 is an example diagram illustrating operational steps to dispatch a mapping service environment, in accordance with an embodiment of the present invention.

FIG. 10 is an example diagram 1000 illustrating a cloud determined mapping service environment, in accordance with an embodiment of the present invention. In this embodiment, the program 304 orchestrates steps to dispatch tasks to map services based on a computing devices 302 location and the classified task. In this embodiment, the program 304 transmits instructions to a cloud map service 1002 and a local map service 1004 from a computing device 1006.

In step 1001, a region manager identifies the region that the computing device 1006 is located within. In this embodiment, the program 304 transmits instructions to the region manager 1008 located within the cloud map service 1002 to identify the region by communicating with a local region manager 1010 located within the local map service 1004. In this embodiment, the program 304 transmits the location of the computing device 1006 to the regional manager 1008.

In step 1003, the local region manager 1010 updates the map stored within a map database 1012 located with the local map service 1004. In this embodiment, the program 304 transmits instruction to the local region manager 1010 to dynamically update the map database 1012 in response to receiving region identification from the region manager 1008.

In step 1005, the local region manager 1010 transmits the updated regional information to the region manager 1008. In this embodiment and in response to the local region manager 1010 updating the map database 1012, the program 304 transmits instructions to the region manager 1008 to receive the updated regional information from the local region manager 1010.

In step 1007, the region manager 1008 located within the cloud map service 1002 notifies other regional managers 1014. In this embodiment and in response to the region manager 1008 receiving updated regional information, the program 304 transmits instructions to the region manager to transmit a notification to other local region managers 1014 located outside the local map service 1004 and the cloud map service 1002. In this embodiment, the program 304 transmits instructions to the region manager 1008 to transmit a notification that comprises the region service is changed based on the location of the computing device 1006 and the updated map information.

In step 1009, the computing device 1006 sends data to an edge twin 1016 located within the local map service 1004. In this embodiment, the program 304 transmits instructions to the computing device 1006 to send data to the edge twin 1016 located within the local map service 1004.

In step 1011, the edge twin 1016 receives twin data. In this embodiment and in response to receiving data from the computing device 1006, the program 304 transmits instructions to the edge twin 1016 located within the local map service 1004 to receive twin data from a digital twin database 1018.

In step 1013, the edge twin 1016 retrieves regional map information. In this embodiment and in response to receiving twin data from the digital twin database 1018, the program 304 transmits instructions to the edge twin 1016 to retrieve regional map information from the map database 1012 located within the local map service 1004.

In step 1015, the edge twin 1016 updates the twin data. In this embodiment and in response to retrieving regional map information, the program 304 transmits instructions to the edge twin 1016 to update twin data located within the digital twin database 1018 based on the received data from the computing device 1006 and the regional map information from retrieved from the map database 1012.

In step 1017, the edge twin 1016 determines a delegated method. In this embodiment and in response receiving data from the computing device 1006, retrieving regional map information from the map database 1012, and updating twin data within the digital twin database 1028, the program 304 transmits instructions to the edge twin 1016 to determine a delegated method for the received data. In this embodiment, the program 304 determines the delegated method for the received data by transferring the received data to a local dispatch service 1020.

In step 1019, the local dispatch service 1020 identifies a task class. In this embodiment and in response to determining the delegated method for the received data, the program 304 transmits instructions to the local dispatch service 1020 to identify a task class based on the received data from the edge twin 1016 and the determination of the delegation method for the received data.

In step 1021, the local dispatch service 1020 retrieves task class definitions. In this embodiment and in response to identifying the task class, the program 304 transmits instructions to the local dispatch service 1020 to retrieve additional task definitions and parameters from a task class database 1024. In this embodiment, the task class database 1024 is located within the local map service 1004 and stores the definitions and parameters for known task classes.

In step 1023, the local dispatch service 1020 determines severity with escalated conditions. In this embodiment and in response to retrieving task class definitions, the program 304 transmits instructions to the local dispatch service 1020 to determine severity of the received data by applying escalated conditions by a local context service 1026. In this embodiment, the escalated conditions are conditions that escalate the severity associated with a task class and the received data.

In step 1025, the local context service 1026 retrieves current contexts. In this embodiment and in response to determining the severity with escalated conditions, the program 304 transmits instructions to the local context service 1026 to retrieve current contexts from a context database 1028 located within the local map service 1004. The current contexts provide details on specific conditions that escalate the severity of the task class and the severity of the received data.

In step 1027, the local context service 1026 returns the severity determination. In this embodiment and in response to the local context service 1026 retrieving current contexts from the context database 1028, the program 304 transmits instructions to the local context service 1026 to return the severity determination of the task class and received information to the local dispatch service 1020.

In step 2029, the local dispatch service 1020 dispatches the task. In this embodiment and in response to the local context service 1026 returning the severity determination to the local dispatch service 1020, the program 304 transmits instructions to the local dispatch service 1020 to dispatch the task to other map services when specific conditions are met. In another embodiment, the program 304 transmits instructions to the local dispatch service 1020 to process the task class and received information on the local processor 1022 when the specific condition is met.

Figure 11:
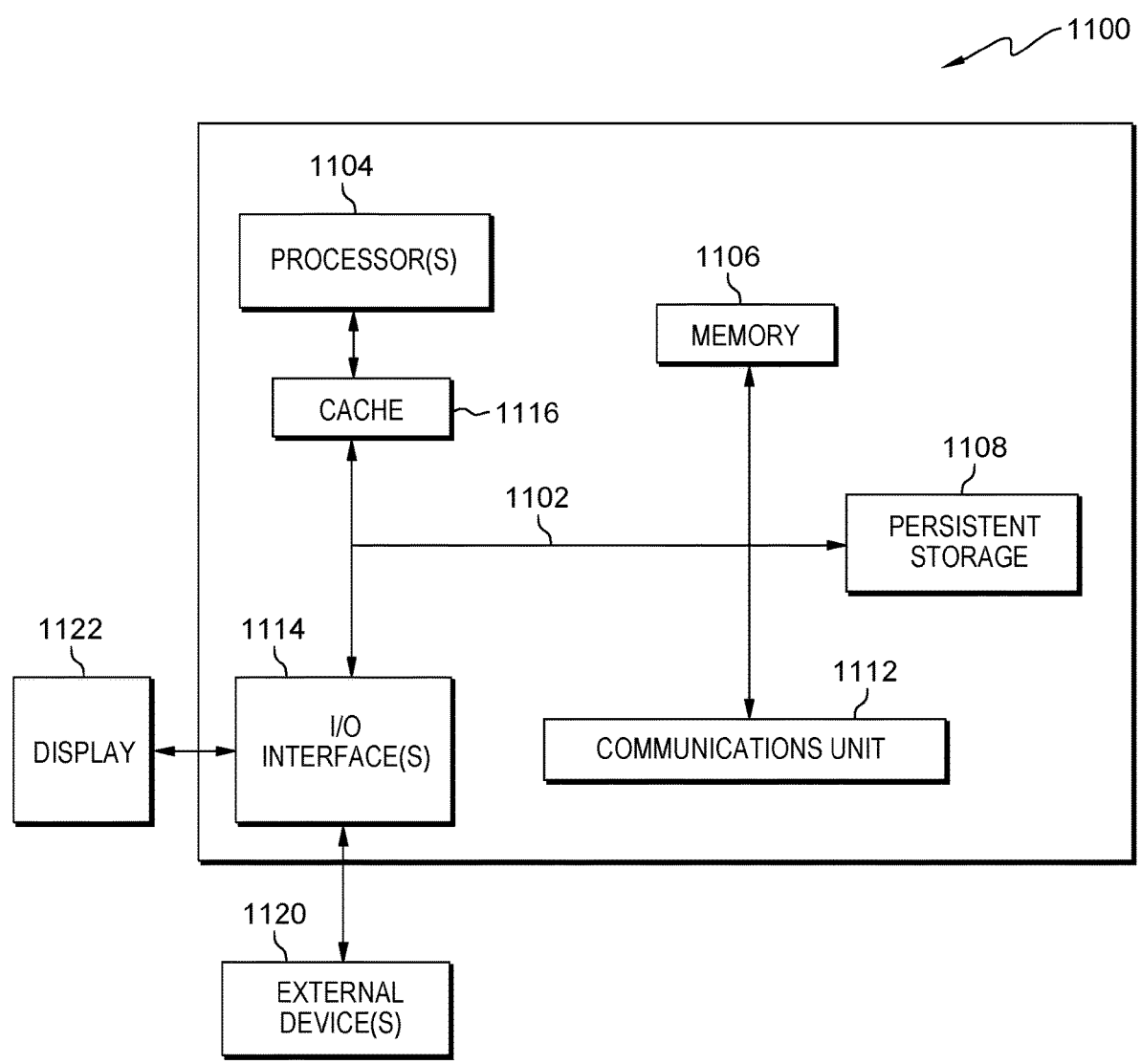
FIG. 11 depicts a block diagram of components of computing systems within a computing display environment of FIG. 3, in accordance with an embodiment of the present invention.

FIG. 11 depicts a block diagram of components of computing systems within a computing display environment 1100 of FIG. 3, in accordance with an embodiment of the present invention. It should be appreciated that FIG. 11 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer display environment 1100 includes a communications fabric 1102, which provides communications between a cache 1116, a memory 1106, a persistent storage 1108, a communications unit 1110, and an input/output (I/O) interface(s) 1112. The communications fabric 1102 can be implemented with any architecture designed for passing data and/or control information between processors (such as microprocessors, communications and network processors, etc.), system memory, peripheral devices, and any other hardware components within a system. For example, the communications fabric 1102 can be implemented with one or more buses or a crossbar switch.

The memory 1106 and the persistent storage 1108 are computer readable storage media. In this embodiment, the memory 1106 includes random access memory (RAM). In general, the memory 1106 can include any suitable volatile or non-volatile computer readable storage media. The cache 1116 is a fast memory that enhances the performance of the computer processor(s) 1104 by holding recently accessed data, and data near accessed data, from the memory 1106.

The program 304 may be stored in the persistent storage 1108 and in the memory 1106 for execution by one or more of the respective computer processors 1104 via the cache 1116. In an embodiment, the persistent storage 1108 includes a magnetic hard disk drive. Alternatively, or in addition to a magnetic hard disk drive, the persistent storage 1108 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 1108 may also be removable. For example, a removable hard drive may be used for the persistent storage 1108. Other examples include optical and magnetic disks, thumb drives, and smart cards that are inserted into a drive for transfer onto another computer readable storage medium that is also part of the persistent storage 1108.

The communications unit 1110, in these examples, provides for communications with other data processing systems or devices. In these examples, the communications unit 1110 includes one or more network interface cards. The communications unit 1110 may provide communications through the use of either or both physical and wireless communications links. The program 304 may be downloaded to the persistent storage 1108 through the communications unit 1110.

The I/O interface(s) 1112 allows for input and output of data with other devices that may be connected to a mobile device, an approval device, and/or the server computing device 308. For example, the I/O interface 1112 may provide a connection to external devices 1118 such as a keyboard, keypad, a touch screen, and/or some other suitable input device. External devices 1118 can also include portable computer readable storage media such as, for example, thumb drives, portable optical or magnetic disks, and memory cards. Software and data used to practice embodiments of the present invention, e.g., the program 304, can be stored on such portable computer readable storage media and can be loaded onto the persistent storage 1108 via the I/O interface(s) 1112. The I/O interface(s) 1112 also connect to a display 1120.

The display 1120 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to receiving a data packet from a computing device, classifying the data packet as a task having one or more portions;
   allocating the classified task to a processing location within a data region based on a location of the computing device;
   in response to a change associated with the task, dynamically calculating alternate processing locations within a radius of the data region to process one or more portions of the task based on scoring values associated with the change; and
   redistributing at least one portion of the classified task according to an alternate processing location of dynamically calculated alternate processing locations.

2. The computer-implemented method of claim 1, wherein dynamically calculating alternate processing locations comprises selecting at least one processing location by:
   identifying a score associated with at least one portion of the task;
   identifying a placement of the score on a scale used to determine alternate processing locations; and
   identifying an alternate processing location based on the placement of the score.

3. The computer-implemented method of claim 1, wherein calculating alternate processing locations comprises assigning weights for individual features of a task based on contextual factors, including a change associated with the classified task.

4. The computer-implemented method of claim 1, wherein dynamically calculating one or portions of the task comprises assigning weights for features of a task based on a calculated score and severity of the classified task.

5. The computer-implemented method of claim 1, wherein dynamically calculating alternate processing locations comprises aggregating calculated scores of the task to determine a quantified placement of the task on a generated scale.

6. The computer-implemented method of claim 1, wherein dynamically calculating one or more portions of the task comprises synchronizing the calculated scores by transmitting a portion of the task currently being processed at a location outside a pre-defined area of the device to an alternate processing location that is located within the pre-defined area of the device.

7. The computer-implemented method of claim 1, wherein dynamically calculating alternate processing locations comprises dispatching tasks to multi-accessing edge computing servers using radio tower signals to transmit data.

8. The computer-implemented method of claim 1, wherein dynamically calculating alternate processing locations comprises dispatching the classified task based on an overall weighted score using a user-defined range.

9. A computer program product comprising:
one or more computer readable storage media and program instructions stored on the one or more computer readable storage media, the program instructions comprising:
in response to receiving a data packet from a computing device, program instructions to classify the data packet as a task having one or more portions;
program instructions to allocate the classified task to a processing location within a data region based on a location of the computing device;
in response to a change associated with the task, program instructions to dynamically calculate alternate processing locations within a radius of the data region to process one or more portions of the task based on scoring values associated with the change; and
program instructions to redistribute at least one portion of the classified task according to an alternate processing location of dynamically calculated alternate processing locations.

10. The computer program product of claim 9, wherein the program instructions to dynamically calculate alternate processing locations comprise program instructions to select at least one processing location by:
program instructions to identify a score associated with at least one portion of the task;
program instructions to identify a placement of the score on a scale used to determine alternate processing locations; and
program instructions to identify an alternate processing location based on the placement of the score.

11. The computer program product of claim 9, wherein the program instructions to calculate alternate processing locations comprise program instructions to assign weights for individual features of a task based on contextual factors, including a change associated with the classified task.

12. The computer program product of claim 9, wherein the program instructions to calculate alternate processing locations comprise program instructions to assign weights for features of a task based on a calculated score and severity of the classified task.

13. The computer program product of claim 9, wherein the program instructions to calculate alternate processing locations comprises program instructions to aggregate calculated scores of the task to determine a quantified placement of the task on a generated scale.

14. The computer program product of claim 9, wherein the program instructions to dynamically calculate one or more portions of the task comprise program instructions to synchronize the calculated scores by transmitting a portion of the task currently being processed at a location outside a pre-defined area of the device to an alternate processing location that is located within the pre-defined area of the device.

15. The computer program product of claim 9, wherein the program instructions to calculate alternate processing locations comprise program instructions to dispatch tasks to multi-accessing edge computing servers using radio tower signals to transmit data.

16. The computer program product of claim 9, wherein the program instructions to calculate alternate processing locations comprise program instructions to dispatch the classified task based on an overall weighted score using a user-defined range.

17. A computer system comprising:
one or more computer processors;
one or more computer readable storage media; and
program instructions stored on the one or more computer readable storage media for execution by at least one of the one or more processors, the program instructions comprising:
in response to receiving a data packet from a computing device, program instructions to classify the data packet as a task having one or more portions;
program instructions to allocate the classified task to a processing location within a data region based on a location of the computing device;
in response to a change associated with the task, program instructions to dynamically calculate alternate processing locations within a radius of the data region to process one or more portions of the task based on scoring values associated with the change; and
program instructions to redistribute at least one portion of the classified task according to an alternate processing location of dynamically calculated alternate processing locations.

18. The computer system of claim 17, wherein the program instructions to dynamically calculate alternate processing locations comprise program instructions to select at least one processing location by:
program instructions to identify a score associated with at least one portion of the task;
program instructions to identify a placement of the score on a scale used to determine alternate processing locations; and
program instructions to identify an alternate processing location based on the placement of the score.

19. The computer system of claim 17, wherein the program instructions to dynamically calculate alternate processing locations comprise program instructions to assign weights for individual features of a task based on contextual factors, including a change associated with the classified task.

20. The computer system of claim 17, wherein the program instructions to dynamically calculate alternate processing locations comprise program instructions to assign weights for features of a task based on a calculated score and severity of the classified task.

21. A computer-implemented method comprising:
- in response to receiving a data packet from a computing device, classifying the data packet as a task having one or more portions;
- allocating the classified task to a processing location within a data region based on a location of the computing device; and
- in response to receiving feedback from the processing location, altering portions of the task to include additional processing instructions using alternate mapping regions and respectively associated processing locations.

22. The computer-implemented method of claim 21, wherein altering portions of the task comprises modifying the task to avoid an object.

23. A computer-implemented method comprising:
- in response to receiving a data packet from a computing device, classifying the data packet as a task having one or more portions;
- allocating the classified task to a processing location within a data region based on a location of the computing device;
- in response to a change in location, optimizing one or more portions of the classified task based on a radius of the data region and a scoring values associated with the change; and
- redistributing at least one portion of the classified task according to the optimization of one or more portions of the task.

24. The computer-implemented method of claim 23, wherein optimizing at least one portion of the classified tasks comprises:
- identifying a score associated with at least one portion of the task;
- identifying a placement of the score on a scale used to determine rank of portions of the classified task; and
- identifying an alternate sequence of the classified task based on the placement of the score.

25. The computer-implemented method of claim 23, wherein optimizing at least one portion of the classified tasks comprises optimizing calculated scores by transmitting a portion of the classified task currently being processed at a location outside a pre-defined area of the device to an alternate processing location that is located within the pre-defined area of the device.

* * * * *